United States Patent

Suzuki et al.

(10) Patent No.: US 8,064,554 B2
(45) Date of Patent: Nov. 22, 2011

(54) RADIO COMMUNICATION SYSTEM PERFORMING MULTI-CARRIER TRANSMISSION, RECEPTION DEVICE, RECEPTION METHOD, TRANSMISSION DEVICE, TRANSMISSION METHOD, DELAY TIME CALCULATION DEVICE, AND DELAY TIME CALCULATION METHOD

(75) Inventors: Mitsuhiro Suzuki, Chiba (JP); Chihiro Fujita, Kanagawa (JP); Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 1105 days.

(21) Appl. No.: 10/548,382

(22) PCT Filed: Jun. 7, 2004

(86) PCT No.: PCT/JP2004/007948

§ 371 (c)(1),
(2), (4) Date: Sep. 8, 2005

(87) PCT Pub. No.: WO2005/002101

PCT Pub. Date: Jan. 6, 2005

(65) Prior Publication Data

US 2006/0172713 A1 Aug. 3, 2006

(30) Foreign Application Priority Data

Jun. 19, 2003 (JP) ................................. 2003-174435
Jul. 11, 2003 (JP) ................................. 2003-273128

(51) Int. Cl.
*H03D 1/06* (2006.01)
*H03D 11/04* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/348; 375/263; 375/324; 375/340; 370/348

(58) Field of Classification Search .......... 375/259–260, 375/229, 263, 316, 322, 324, 340, 346, 348; 370/203, 479, 480
See application file for complete search history.

(56) References Cited

U.S. PATENT DOCUMENTS 6,031,390 A * 2/2000 Fant et al. ....................... 326/36
(Continued)

FOREIGN PATENT DOCUMENTS

JP 11-145930 5/1999
(Continued)

OTHER PUBLICATIONS

Wang, Zhengdao et al., "Wireless Multicarrier Communications Where Fourier Meets Shannon", IEEE Signal Processing Magazine, vol. 17, No. 3, pp. 29 to 48, 2000.

(Continued)

*Primary Examiner* — David C. Payne
*Assistant Examiner* — James M Perez
(74) *Attorney, Agent, or Firm* — Oblon, Spivak, McClelland, Maier & Neustadt, L.L.P.

(57) ABSTRACT

Multi-carrier transmission is performed without inserting a repetitive signal into guard interval periods. A transmitter provides guard interval periods by using a null signal to save transmission power and prevent the deterioration of the SN ratio. Delayed waves at the head of each received symbol cause high-frequency waves to occur and carriers to interfere with one another. Accordingly, a receiver adds a component following each received symbol to a delayed-wave component at the head of the received symbol. As a result, the delayed-wave component at the head of the received symbol and the added component become continuous in wave form and subcarriers do not interfere with each other.

2 Claims, 22 Drawing Sheets

U.S. PATENT DOCUMENTS

| | | | |
|---|---|---|---|
| 6,826,240 B1 * | 11/2004 | Thomas et al. | 375/340 |
| 2003/0165131 A1 * | 9/2003 | Liang et al. | 370/342 |
| 2004/0013084 A1 * | 1/2004 | Thomas et al. | 370/210 |
| 2004/0110510 A1 * | 6/2004 | Jeon et al. | 455/450 |
| 2004/0136314 A1 * | 7/2004 | Jung et al. | 370/203 |
| 2004/0141548 A1 * | 7/2004 | Shattil | 375/146 |
| 2004/0190560 A1 * | 9/2004 | Maltsev et al. | 370/503 |
| 2004/0240527 A1 * | 12/2004 | Giannakis et al. | 375/138 |
| 2007/0253496 A1 * | 11/2007 | Giannakis et al. | 375/260 |

FOREIGN PATENT DOCUMENTS

| | | |
|---|---|---|
| JP | 2000-22657 | 1/2000 |
| JP | 2000-59332 | 2/2000 |
| JP | 2000-134176 | 5/2000 |
| JP | 2001-69110 | 3/2001 |
| JP | 2003-92559 | 3/2003 |
| JP | 2003-110520 | 4/2003 |

OTHER PUBLICATIONS

Scaglione, Anna et al., "Robust OFDM Transmissions Over Frequency-Selective Channels With Multiplicative Time-Selective Effects", Acoustics, Speech, and Signal Processing, vol. 5, pp. 2677 to 2680, 2000.

Barbarossa, Sergio et al., "Performance Analysis of a Deterministic Channel Estimator for Block Transmission Systems with Null Guard Intervals", IEEE Transaction on Signal Processing, vol. 50, No. 3, pp. 684 to 695, 2002.

Muquet, Bertrand et al. "Cyclic Prefixing or Zero Padding for Wireless Multicarrier Transmission?", IEEE Transaction on Communications, vol. 50, No. 12, pp. 2136 to 2148, 2002.

* cited by examiner

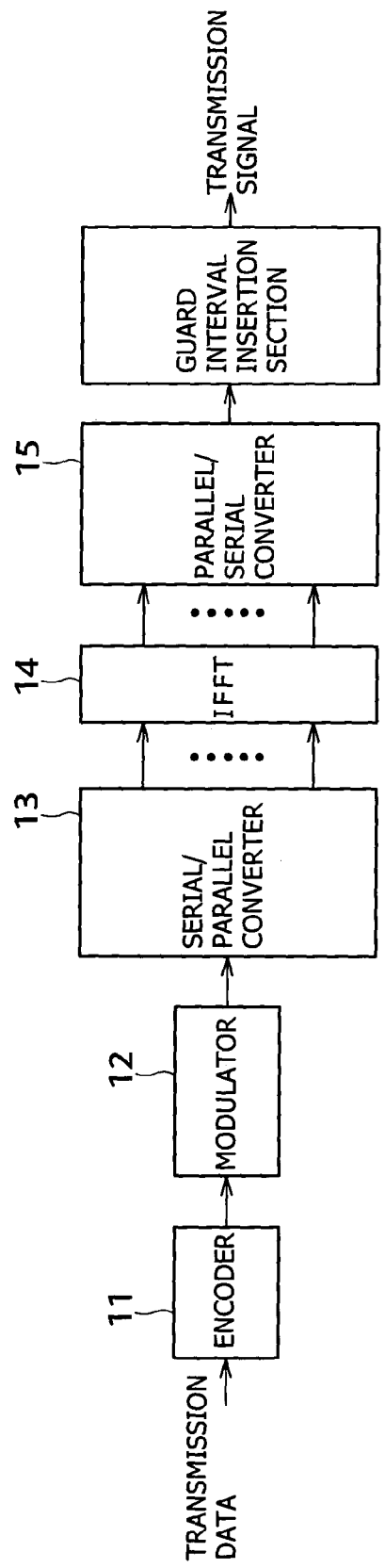

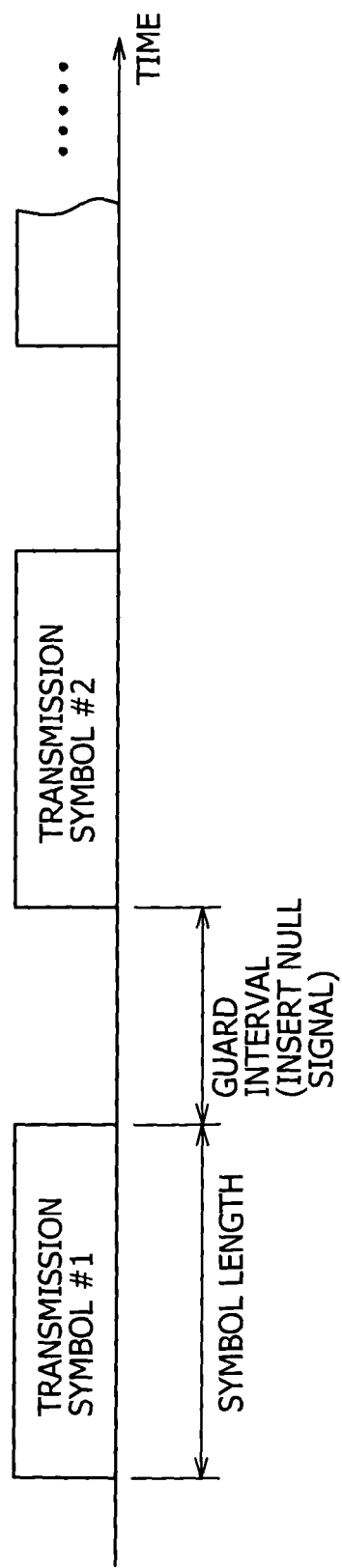

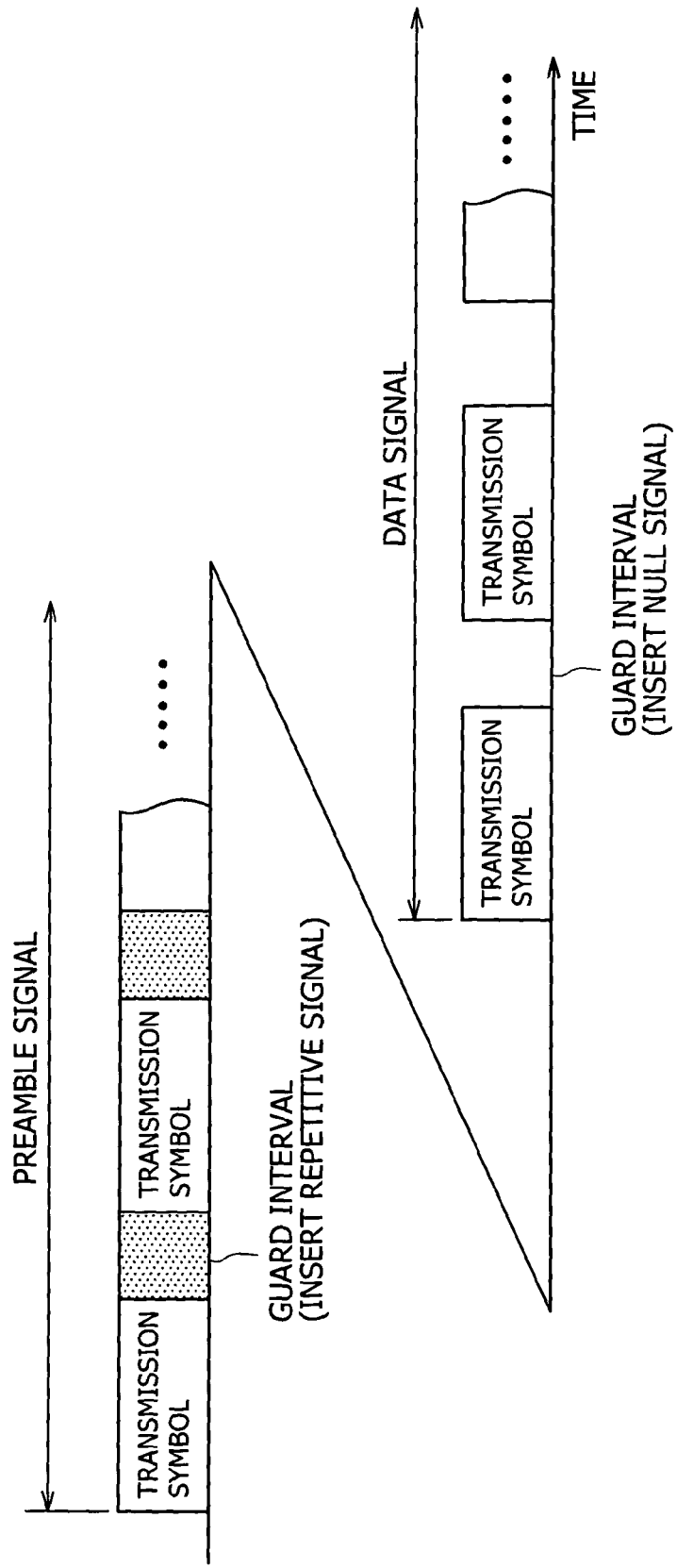

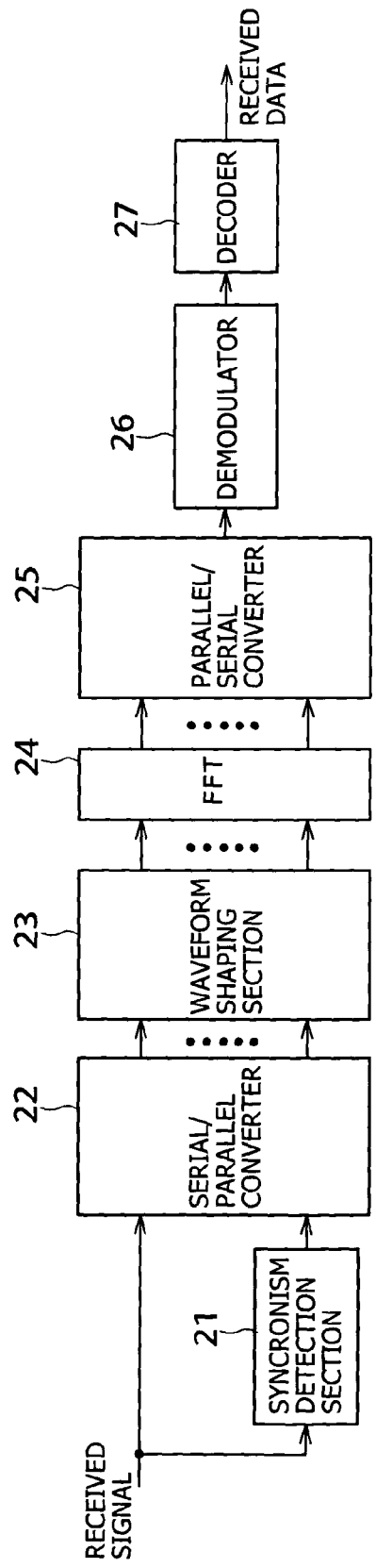

F I G. 6
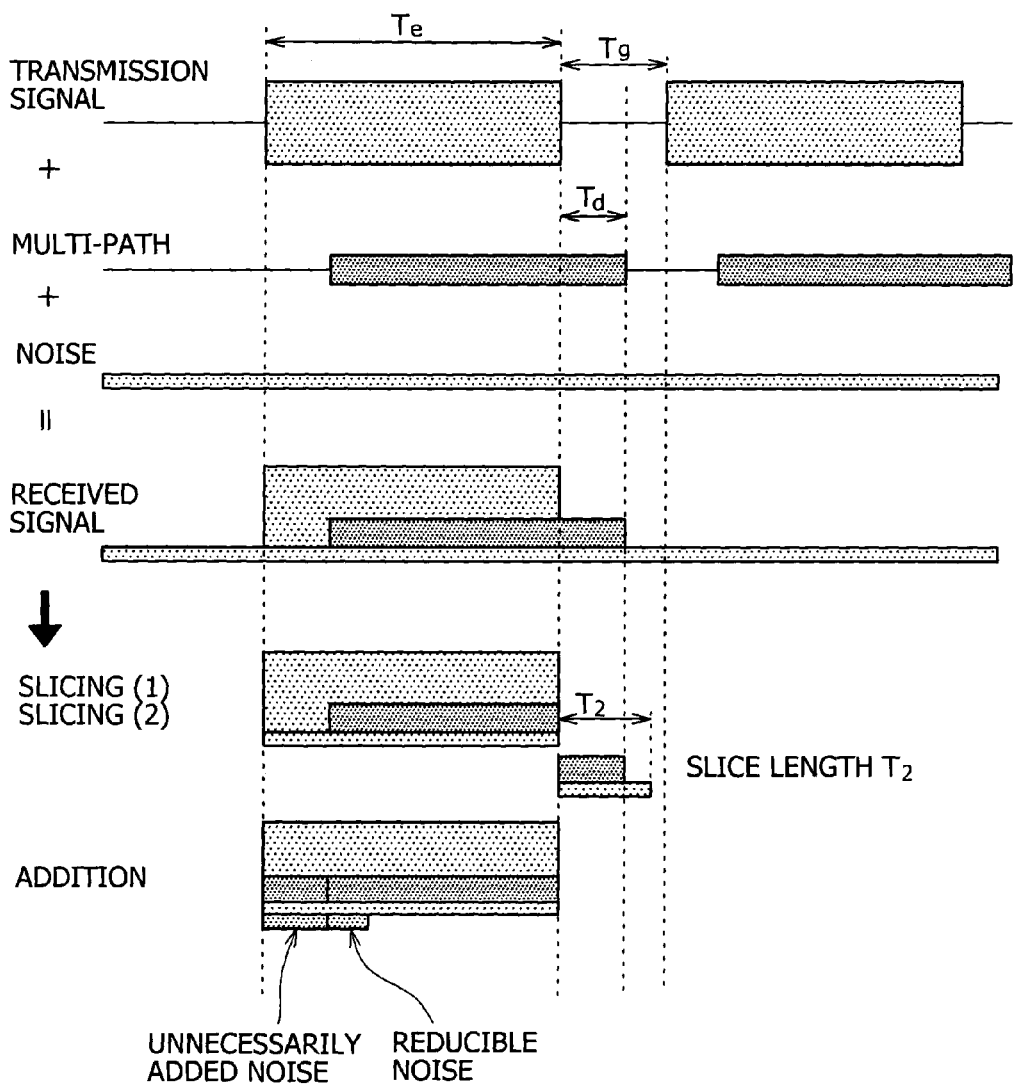

F I G. 7
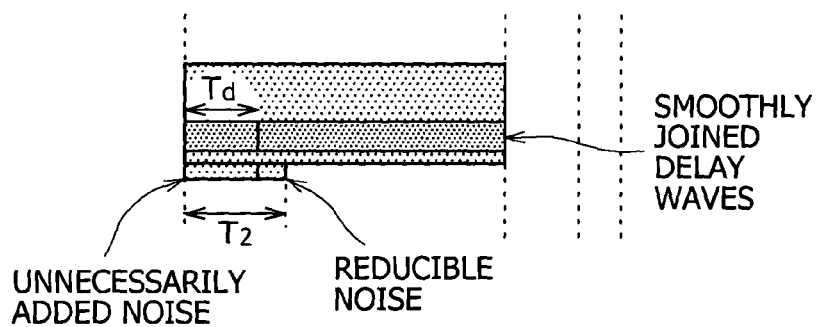
F I G. 8
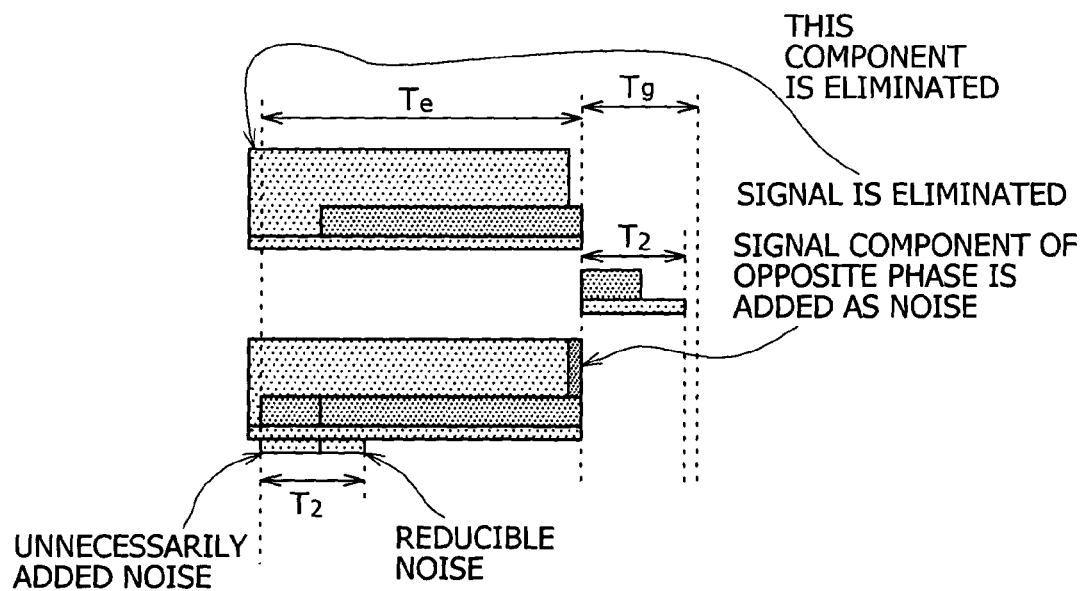

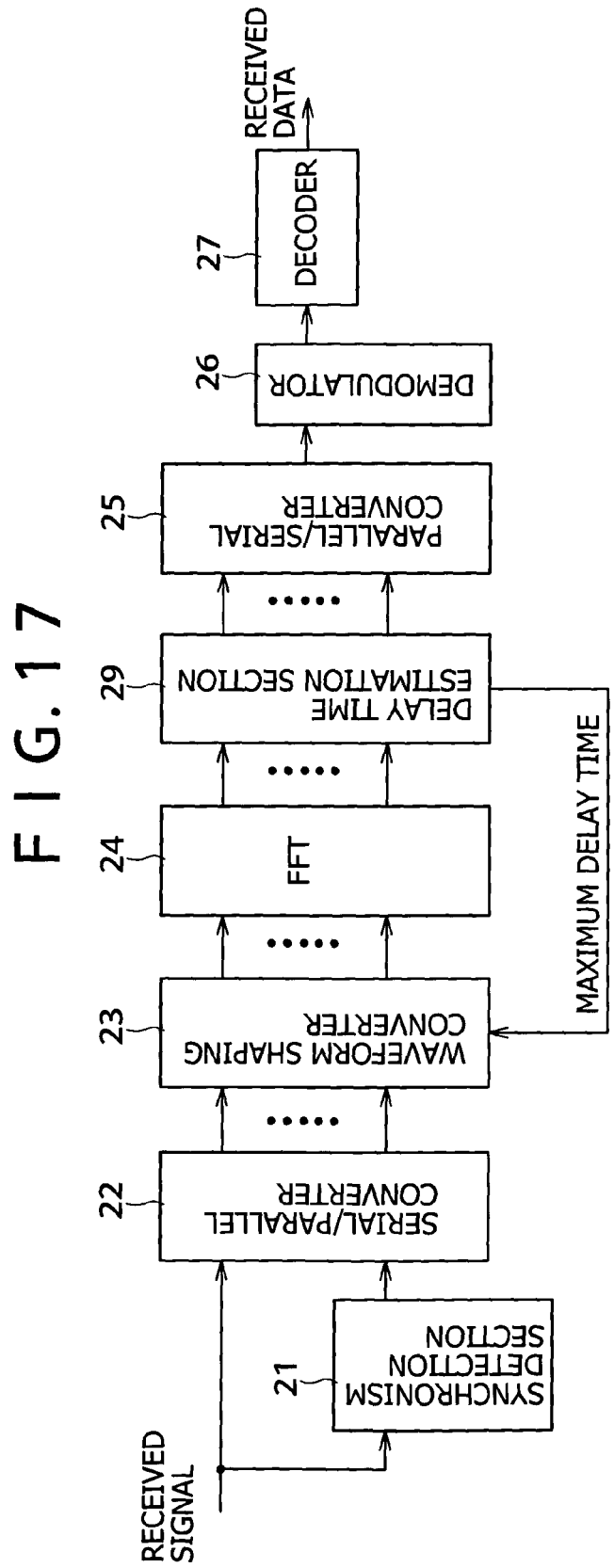
F I G. 17

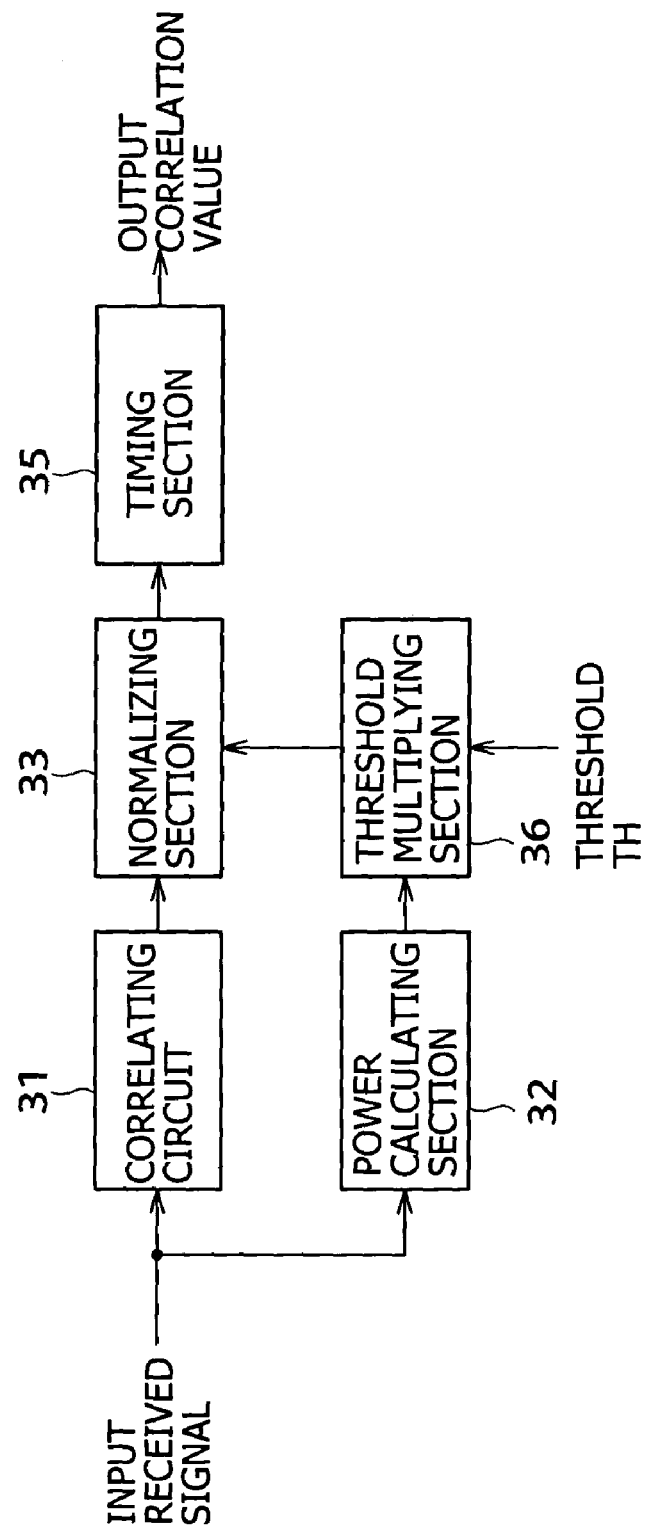
F I G. 1 9

F I G. 2 0
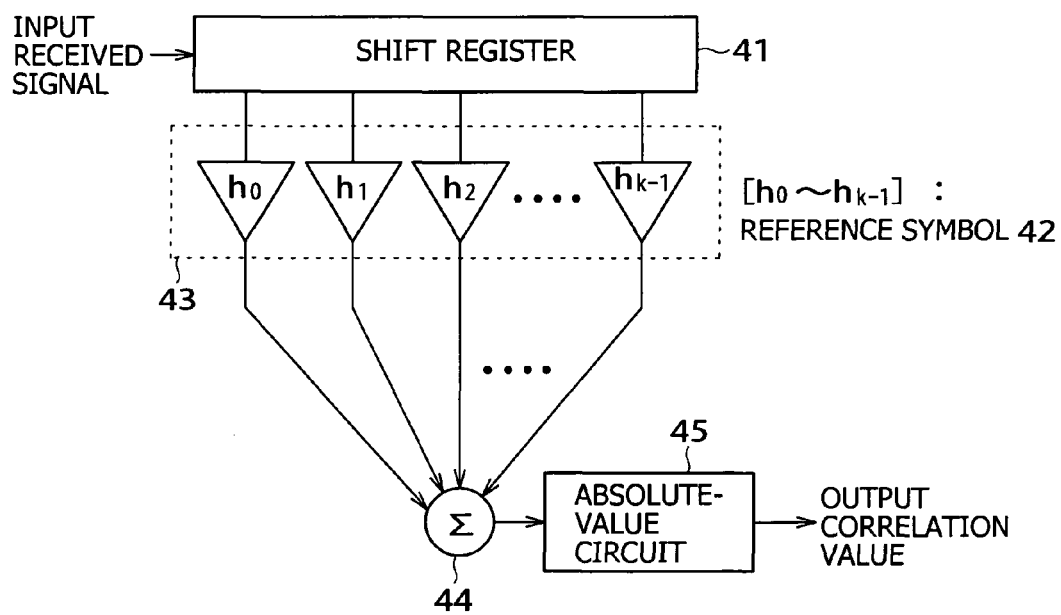

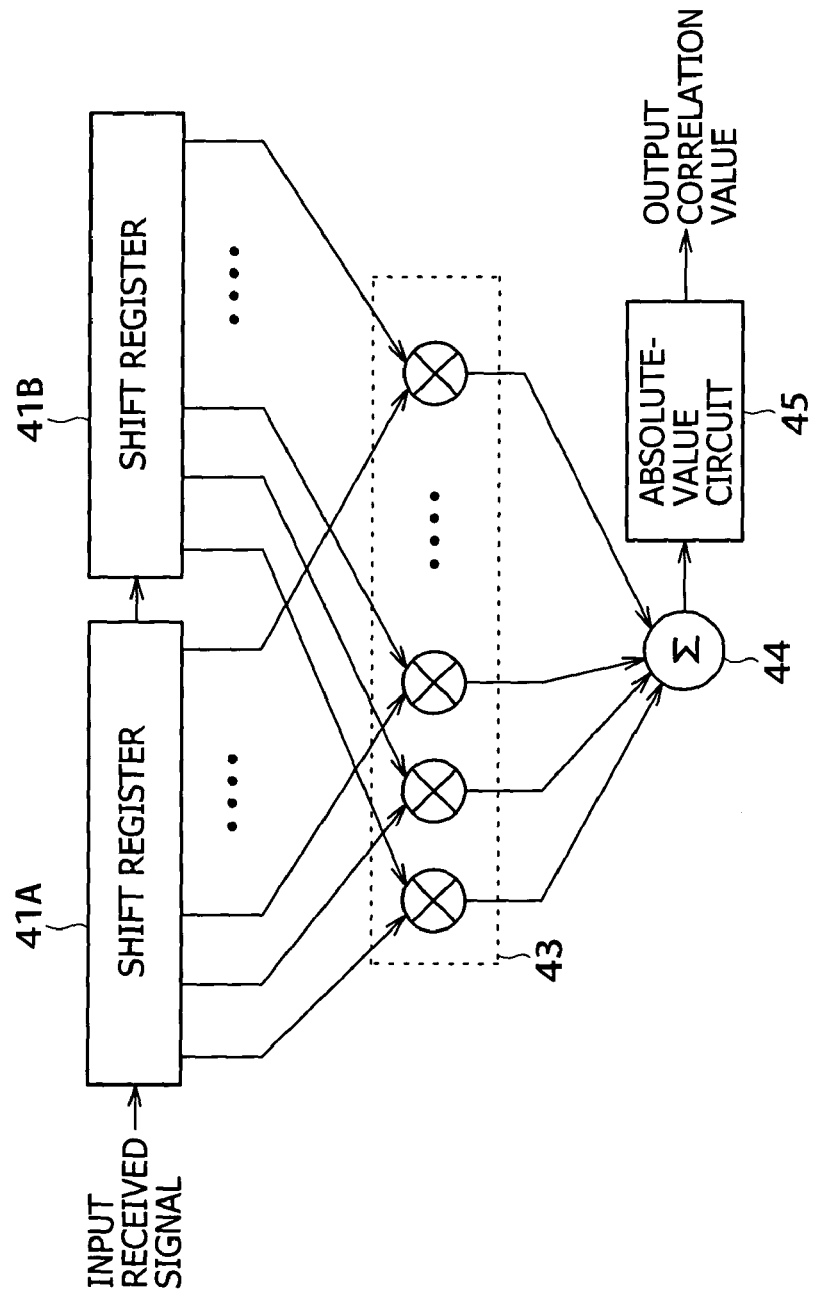

RADIO COMMUNICATION SYSTEM PERFORMING MULTI-CARRIER TRANSMISSION, RECEPTION DEVICE, RECEPTION METHOD, TRANSMISSION DEVICE, TRANSMISSION METHOD, DELAY TIME CALCULATION DEVICE, AND DELAY TIME CALCULATION METHOD

BACKGROUND OF THE INVENTION

1. Field of the Invention

This invention relates to a radio communication system, a receiver, a receiving method, a transmitter, a transmitting method, and a device for and a method of calculating delay times to perform multi-carrier transmission in a multi-path environment such as a room wherein reflected waves and delayed waves as well as direct waves are propagated. Specifically, this invention relates to a radio communication system, a receiver, a receiving method, a transmitter, a transmitting method, and a device for and a method of calculating delay times to perform multi-carrier transmission by allotting data to be transmitted to carriers of different frequencies in order to cope with delay distortion.

More specifically, this invention relates to a radio communication system, a receiver, a receiving method, a transmitter, a transmitting method, and a device for and a method of calculating delay times to perform multi-carrier transmission by providing guard intervals between symbols to be transmitted in order to prevent interference between symbols. Furthermore, this invention relates to a radio communication system, a receiver, a receiving method, a transmitter, a transmitting method, and a device for and a method of calculating delay times to perform multi-carrier transmission by providing guard interval periods, which do not raise the transmission power, between symbols to be transmitted in order to prevent interference between symbols and among carriers.

2. Description of Related Art

With computers of ever-rising performance, there is a growing tendency for us to connect computers to build LAN's (Local Area Networks) in order to share data, information, and files and exchange data, information, and pieces of mail.

In a conventional LAN, computers are connected with optical-fiber cables, coaxial cables, and twisted-pair cables. Thus, such a conventional LAN requires complicated wiring of such cables; accordingly, it cannot be built easily. Besides, such a conventional LAN is not convenient because the ranges of movement of its component devices are limited by the length of cables.

The wireless LAN has lately attracted considerable attention, wherein components devices such as PC's can be moved relatively easily because they are free of connecting cables.

As the operating speed of wireless LAN's has increased and their costs has lowered recently, the demand for them has increased remarkably. Besides, the introduction of the personal area network (PAN) is considered. The PAN is a small-scale wireless network of electronic devices around us.

If a wireless network is built in a room, there is created a multi-path environment where each receiver receives direct, reflected, and delayed waves at the same time. The multi-path transmission causes delay distortion (frequency-selective fading), which causes errors in communication and interference between symbols.

One of the measures against delay distortion is the multi-carrier transmission system. According to the system, data are allotted to two or more carriers of different frequencies and transmitted; therefore, the bandwidth of each carrier is narrow and, hence, each carrier is less affected by frequency-selective fading.

Adopted in, for example, IEEE 802.11a, one of the wireless LAN standards, is the OFDM (Orthogonal Frequency Division Multiplexing) system, one of the multi-carrier transmission systems. According to the system, the frequencies of carriers are set so that they will lie at right angles to one another. Serially transmitted signals undergo serial-parallel conversion every symbol period, or cycle, slower than the data-transmission rate and are outputted. The outputted signals are allotted to the carriers. The signals of each carrier undergo amplitude and phase modulation. The signals of the carriers undergo inverse FFT to become signals on the time axis, the carriers lying at right angles to one another on the frequency axis, and are transmitted. Received signals undergo FFT to become signals on the frequency axis. The signals of each carrier undergo demodulation corresponding to the above modulation of signals of said carrier. The signals of the carriers undergo parallel-serial conversion to become serial signals.

According to the OFDM transmission system, the length of symbols can be increased by using two or more subcarriers lying at right angles to one another; therefore, the OFDM transmission system is suitable to multi-path transmission. However, there is the problem that if there are multi-path components, delayed waves interfere with the next symbol, causing interference between symbols. Besides, there occurs interference between subcarriers (interference between carriers), too, deteriorating the characteristics of reception.

On the other hand, there is available a method of providing guard intervals between symbols to be transmitted in order to prevent interference between symbols. Namely, guard signals such as guard intervals or guard bands in accordance with prescribed guard-interval or guard-band size and times are inserted between symbols to be transmitted.

It is also common to repeatedly transmit part of the signal to be transmitted in each guard interval period (see, for example, non-patent literature 1). By inserting a repetitive signal into guard interval periods, multi-path propagation (propagation of waves of multiple reflection) smaller than the size of guard intervals can be absorbed and interference between subcarriers can be prevented. Thus, the fatal deterioration of the quality of reception is prevented. Besides, inserting a repetitive signal into guard intervals brings about advantages such as synchronization of times and periods, or cycles, of symbols. If a repetitive signal is not inserted into guard intervals, the bit-error rate lowers (see, for example, non-patent literature 2).

On the other hand, if a repetitive signal is inserted into guard interval periods, the repetitive signal is removed at a receiver; accordingly, the repetitive signal transmitted does not contribute as signal power at the receiver. Therefore, inserting a repetitive signal causes the electric power necessary for transmission to increase.

Besides, inserting a repetitive signal causes the length of symbols to be transmitted to increase; accordingly, interference among carriers occurs, increasing the electric power necessary for transmission per unit frequency. If the electric power necessary for transmission per unit frequency is restricted by law, the transmission power has to be reduced by the above increment beforehand, causing the signal-noise ratio to deteriorate.

To save electric power, a null signal instead of a repetitive one may be inserted into guard intervals. In this case, the problem of the decline of the bit-error rate can be solved by using, for example, an equalizer (see, for example, non-patent literature 3 and 4). In this case, however, the adoption of an equalizer causes the circuit of the system to become complex and the cost of the system to increase.

[Non-Patent Literature 1]
"Digital Broadcasting" by M. Shiomi et al. (Ohmsha 1998)
[Non-Patent Literature 2]
"On the Use of a Cyclic Extension in OFDM" by R. Morrison et al. (0-7803-7005-8/$10.00 IEEE, 2001)
[Non-Patent Literature 3]
"Performance Analysis of a Deterministic Channel Estimator for Block Transmission Systems with Null Guard Intervals" by S. Barbarossa et al.
[Non-Patent Literature 4]
"Cyclic Prefixing or Zeor Padding for Wireless Multicarrier Transmissions?" by B. Muquet et al. (IEEE TRANSACTIONS ON COMMUNICATIONS, VOL. 50, NO. 12, DECEMBER 2002)

SUMMARY OF THE INVENTION

It is an object of the present invention to provide a radio communication system, a receiver, a receiving method, a transmitter, a transmitting method, and a device for and a method of calculating delay times to perform multi-carrier transmission in a multi-path environment by allotting data to be transmitted to carriers of different frequencies in order to cope with delay distortion.

It is a further object of the present invention to provide a radio communication system, a receiver, a receiving method, a transmitter, a transmitting method, and a device for and a method of calculating delay times to perform multi-carrier transmission by providing guard intervals between symbols to be transmitted in order to prevent interference between symbols.

It is yet another object of the present invention to provide a radio communication system, a receiver, a receiving method, a transmitter, a transmitting method, and a device for and a method of calculating delay times to perform multi-carrier transmission by providing guard interval periods, which do not raise the transmission power, in order to prevent interference between symbols and among carriers.

Under the circumstances, the present invention was made. One aspect of the present invention is directed to the radio communication system of the present invention, the transmitter transmits a multi-carrier signal whose guard interval periods comprise a null signal and the receiver performs waveform shaping for the signal component at the head of each effective symbol by making use of the signal component following said effective symbol.

The word of "system" used in this specification means a thing formed by logically assembling a plurality of devices (or functional modules to materialize specific functions). Such devices and functional modules may or may not be in a single case.

According to another aspect of the radio communication system of the present invention, the transmitter provides guard interval periods by using a null signal to save transmission power and prevent the deterioration of the SN ratio. On the other hand, delayed waves at the head of each received symbol cause high-frequency waves to occur and the carriers to interfere with one another. Accordingly, the receiver adds the component following each effective symbol of the received signal to the delayed-wave component at the head of said effective symbol. As a result of the addition, the delayed-wave component and the added component become continuous in waveform and subcarriers do not interfere with each other.

In the aspect, the receiver may add the guard interval period following each effective symbol of the signal being received to the head of said effective symbol to perform waveform shaping of the head of said effective symbol, or the receiver may add the delayed-wave component overflowing from the end of each effective symbol into the following guard interval to the head of said effective symbol to perform waveform shaping of the head of said effective symbol.

In the aspect, if an entire guard interval is added to the head of the preceding effective symbol, the noise component in the guard interval too is added to the head of the effective symbol to increase the noise power. Accordingly, the receiver extracts the delayed-wave component overflowing from the end of each effective symbol into the following guard interval from the following guard interval and adds only the delayed-wave component to the head of said effective symbol. Thus, the noise component to be added to each received symbol can be minimized and the SN ratio of the received signal can be improved.

In the aspect, the length of the waveform-shaping portion may be determined in accordance with the power of reception detected from a preamble signal. It is desirable to elongate the waveform-shaping portion if the reception power of the preamble signal is large and shorten the waveform-shaping portion if the reception power of the preamble signal is small, because if the reception power of the preamble signal is small, the ratio of the noise component in the delayed-wave portion is large and, hence, waveform-shaping effect cannot be expected much. On the contrary, signal quality may deteriorate.

In the aspect, the receiver may be provided with a means of estimating the propagation path based on a received signal and a means of determining the delayed-wave component hanging out of the end of each effective symbol into the following guard interval based on the maximum delay time found by the estimation of the propagation path. The transmitter inserts a pilot signal of a known pattern every subcarrier or every several subcarriers; therefore, the receiver can estimate the propagation path based on the signal on the frequency axis after Fourier transformation and find the maximum delay time.

In the aspect, the receiver may use a known pattern such as a preamble signal included in the received signal as a reference symbol to find correlation, calculate the electric power of the received signal, normalize the result of correlation based on the calculated power, determine the maximum delay time by comparing the normalized result of correlation with a prescribed threshold, and determine the delayed-wave component based on the maximum delay time.

In the aspect, the receiver may find correlation by making use of a known pattern in the received signal, calculate the electric power of the received signal, determine the maximum delay time by multiplying the calculated power by a prescribed threshold and comparing the result of correlation with the product, and determine the delayed-wave component based on the maximum delay time. In this case, the division for normalization can be replaced with the multiplication of the threshold value. The circuit of a multiplier is simpler than that of a divider; therefore, the cost of the communication system can be reduced by using a multiplier instead of a divider.

In the aspect, a means for correlation can be made of cross-correlation to find correlation between a reference symbol and the received symbol, auto-correlation to find correlation between known patterns appearing repeatedly in the received signal, and a limiter to find correlation by making the received signal binary.

In the aspect, by making the processing of correlation by using two or more reference symbols, the portion of correlation can be made long and the sensitivity of the means for correlation can be improved.

In the aspect, the transmitter side may insert a repetitive signal or a null signal, as the case may be, into guard intervals between symbols to be transmitted. Specifically, a repetitive signal is inserted into guard intervals during transmission of a preamble signal and a null signal is inserted into guard intervals during transmission of data.

In the aspect, because a repetitive signal is inserted into guard interval periods only while a preamble signal is being transmitted, synchronization can be accomplished more accurately if the receiver makes synchronization with auto-correlation. On the other hand, a null signal is inserted into guard intervals during transmission of data; therefore, the transmission power can be saved and the carriers can be prevented from interfering with one another.

In accordance with the aspects of the present invention, there is provided a radio communication system, a receiver, a receiving method, a transmitter, a transmitting method, and a device for and a method of calculating delay times to perform multi-carrier transmission by providing guard intervals between symbols to be transmitted in order to prevent interference between symbols.

In accordance with the aspects of the present invention, there is provided a radio communication system, a receiver, a receiving method, a transmitter, a transmitting method, and a device for and a method of calculating delay times to perform multi-carrier transmission by providing guard interval periods, which do not raise the transmission power, between symbols to be transmitted in order to prevent interference between symbols and among carriers.

In accordance with the aspects of the present invention, the energy necessary for transmission can be reduced by inserting a null signal into guard intervals. Besides, because no repetitive signal is used in guard intervals, the spectrum of a received signal can be prevented from wobbling and the peak is reduced; accordingly, the transmission power per unit frequency can be reduced.

In accordance with the aspects of the present invention, the interference among carriers can be prevented by adding multi-path components occurred in each guard interval to the head of the preceding effective symbol of the received signal. If the maximum delay time of the multi-path is smaller than the guard interval, the delayed-wave component alone is added to the head of the effective symbol to reduce the noise component to be added to the head and improve the SN ratio. In addition, in accordance with the present invention, the multi-path components can accurately be extracted from received symbols; accordingly, the deterioration of performance of demodulation can be reduced and good communication can be secured.

The other objects, features, and advantages of the present invention will be made clear by embodiments described below and drawings attached hereto.

BRIEF DESCRIPTION OF THE DRAWINGS

FIG. 1 is a block diagram of an OFDM transmitter according to an embodiment of the present invention;

FIG. 2 is an illustration of a signal being transmitted;

FIG. 3 is an illustration of a preamble signal being transmitted;

FIG. 4 is a block diagram of an OFDM receiver according to an embodiment of the present invention;

FIG. 6 shows a problem of increased electric power of noise when an entire guard interval is added to a symbol;

FIG. 7 shows a problem of increased electric power of noise when an entire guard interval is added to a symbol;

FIG. 8 shows a problem of increased electric power of noise when an entire guard interval is added to a symbol;

FIG. 17 is another block diagram of an OFDM receiver to improve the SN radio of received signals in accordance with the situation of the propagation path;

FIG. 19 is another block diagram of the delay time estimation section 29;

FIG. 20 is a block diagram of the inner configuration of a correlating circuit 31;

FIG. 21 is another block diagram of the inner configuration of the correlating circuit 31;

DETAILED DESCRIPTION OF THE PREFERRED EMBODIMENTS

Figure 5:
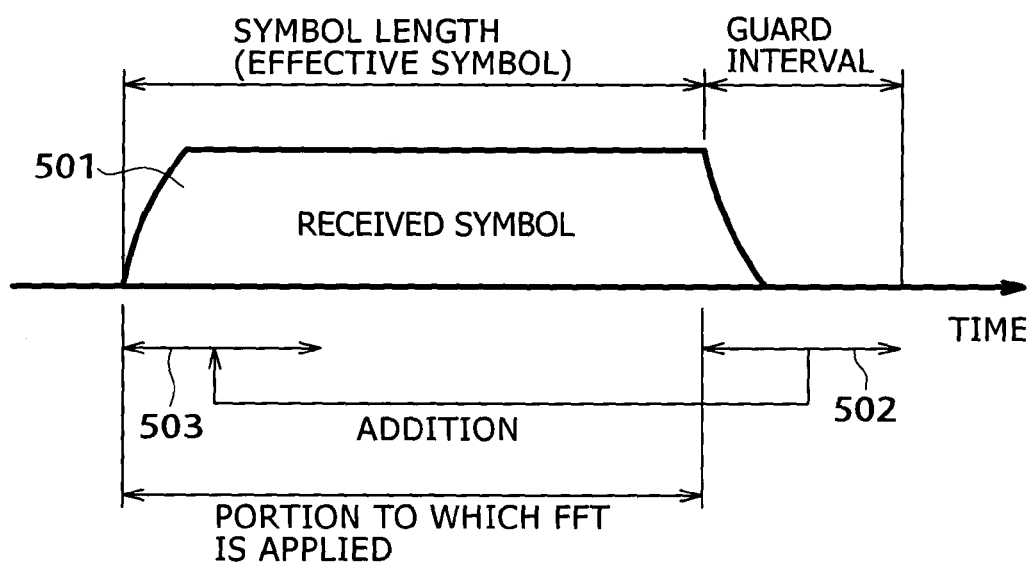
FIG. 5 is an illustration of the workings of a waveform shaping section 23.

By referring to the drawing, an embodiment of the present invention will be described below.

The present invention relates to a communication system wherein adopted is the OFDM system, a technology expected to raise the speed and quality of wireless transmission. The OFDM system is a kind of multi-carrier transmission system. The frequencies of carriers of the OFDM system are set so that the carriers lie at right angles to one another in symbol portions. A high-speed signal is divided into divisions and the signal divisions are allotted to many subcarriers and transmitted; accordingly, the transmission speed of each subcarrier is low and the transmission is less affected by delayed waves.

FIG. 1 is a block diagram of an OFDM transmitter, a component of the communication system of the present invention, comprising an encoder 11, a modulator 12, a serial/ parallel converter 13, an IFFT 14, a parallel/serial converter 15, and a guard interval insertion section 16.

The encoder 11 encodes data to be transmitted with error-correcting codes. The modulator 12 modulates the data in accordance with information about modulation, including times, supplied from a transmission controller 109 by using, for example, the QPSK system. The QPSK (quadrature phase shift keying) system is a kind of phase modulation system, which is a kind of digital modulation system. According to the QPSK system, a signal is transmitted by matching (0, 0) to the "0" phase, (0, 1) to the "π/2" phase, (1, 0) to the "π" phase, and (1, 1) to the "3/π" phase.

After the modulation of data to be transmitted, a known series of data may be inserted as a pilot symbol into the series of modulated symbols in accordance with the pattern and times of insertion of the pilot symbol. The pilot signal of a known pattern is inserted every subcarrier or every several subcarriers.

The serial/parallel converter 13 converts the modulated serial signal divisions into parallel signal divisions in accordance with the number and times of parallel carriers.

The IFFT 14 and parallel/serial converter 15 perform inverse Fourier transformation in accordance with the prescribed size and times of FFT and convert the parallel signal divisions into signal divisions on the time axis, the carriers lying at right angles to one another on the phase axis.

After signal divisions equivalent to one OFDM symbol are transmitted, the guard/interval inserting section 16 switches its output from the parallel/serial converter 15's side to the side of "0" signals (for example, ground) and transmits a null signal for a time equivalent to the length of a guard interval. The guard interval insertion section 16 may insert guard intervals, each consisting of a repetitive signal, only while a preamble signal is being transmitted (or only during a prescribed period).

FIG. 2 is an illustration of a signal being transmitted. As shown in FIG. 2, null signals are inserted as guard intervals between OFDM symbols. The length of guard intervals is determined by the situation of the propagation path, namely, the maximum delay time of delayed waves which affect the demodulation (the delay time is shorter than the guard interval). The interference between symbols can be prevented by making guard intervals longer than the maximum delay time of delayed waves.

In this embodiment, the transmission power can be saved and the signal-noise ratio can be prevented from deteriorating by using a null signal as guard intervals as described above. Besides, more efficient transmission can be made by applying surplus transmission power due to the use of a null signal as guard interval periods to the time periods of symbols being transmitted.

If synchronization processing based on auto-correlation is made at a receiver by using a preamble signal consisting of a known pattern, a repetitive signal may be inserted between symbols only while a preamble signal is being transmitted and guard intervals consisting of a null signal may be inserted between symbols while a data signal is being transmitted in order to accomplish accurate synchronization (see FIG. 3).

FIG. 4 is a block diagram of an OFDM receiver, a component of the communication system of the present invention, comprising a synchronism detection section 21, a serial/parallel converter 22, a waveform shaping section 23, an FFT 24, a parallel/serial converter 25, a demodulator 26, and a decoder 27.

By using the preamble signal, the synchronism detection section 21 extracts information about the synchronization from the received signal which underwent multi-path fading on the propagation path. The transmitter inserts a repetitive signal into guard interval periods only while a preamble signal is being transmitted so that accurate synchronization can be accomplished.

The serial/parallel converter 22 converts the received signal, or serial data, into parallel data for the parallel carriers in accordance with the information about synchronization. Data within the length of a symbol and the following guard interval are collated.

The waveform shaping section 23 performs waveform shaping of the head of an effective symbol by using the following guard interval or the delayed-wave component overflowing from the end of the effective symbol of the received signal into the following guard interval. The workings of the waveform shaping section 23 will be detailed later.

The FFT 24 Fourier-transforms the data within the length of a symbol and the parallel/serial converter 25 converts the data on the time axis into data on the frequency axis and extracts the data from the subcarriers. The demodulator 26 demodulates the extracted data in accordance with the QPSK system or the like. The decoder 27 decodes the data with an error-correcting code. The received data thus obtained are processed by upper layers of the communication protocol.

FIG. 5 is an illustration of the workings of the waveform shaping section 23. The waveform shaping section 23 performs waveform shaping of the head of each received symbol by applying the following guard interval including delayed waves overflowing from the end of the effective symbol of said received symbol to the head of said received symbol.

As shown in FIG. 5, the head 503 of a received symbol 501 is deformed under the influence of delayed waves. If all the delayed waves are within the following guard interval wherein a null signal was inserted at the time of transmission, the delayed waves do not interfere with the next symbol; accordingly, the interference between symbols does not occur. On the other hand, if the portion to be Fourier-transformed (the FFT window) is taken out of a received symbol and Fourier-transformed, interference between subcarriers occurs under the influence of the multi-path and, hence, the characteristics of reception deteriorate considerably.

Accordingly, the waveform shaping section 23 adds the guard interval including the delayed-wave component 502 overflowing from the end of a received symbol 501 to the head 503 of the received symbol 501. Thus, the delayed-wave component 503 of the head of the received symbol and the added guard interval 502 are continuous in waveform; therefore, interference between subcarriers does not occur.

On the other hand, if an entire guard interval is added to the preceding received symbol as shown in FIG. 5, the noise in the guard interval too is added to the received symbol, posing the problem of increased electric power of noise. By referring to FIG. 6, this problem will be discussed below.

As shown in FIG. 6, a normal signal of multi-carrier transmission consists of symbols of length $T_e$ to be transmitted and guard intervals of null signals of length $T_g$ disposed between the symbols. The normal signal is transmitted through a propagation path in a multi-path environment and delayed, or noise, waves with maximum delay time $T_d$ arrive at the receiving side. In addition, the hardware of the receiver produces noise. Thus, the received signal is the transmitted signal overlaid with delayed waves and noise.

As described above by referring to FIG. 5, if the part of the received signal within the length $T_2$ following an effective symbol is added to the head of the effective symbol, the delayed-wave component overflowing from the end of the effective symbol is added to the delayed-wave component at the head of the effective symbol and, hence, the waveform of the received signal becomes continuous.

The noise component extracted together with the delayed-wave component is unnecessary. If the noise component is added to the head of the effective symbol, the SN ratio of the received signal deteriorates. Part of the noise component cannot be separated from the processing for the restoration of the waveform of the head of the effective symbol, and the other part can. Namely, as shown in FIG. 7, the part of the noise component beyond the maximum delay time $T_d$ can be eliminated by finding the maximum delay time $T_d$ accurately and approximating $T_2$ to $T_d$.

As described above, one error factor in adding an entire guard interval to the preceding effective symbol is the addition of noise to the effective symbol. Another error factor is the positional slippage of the FFT window (see FIG. 8). Namely, a signal component of the opposite phase is added as noise to the part where a signal component is missing due to the slippage of the FFT window.

The problem of the addition of noise to the effective symbol may be solved by making use of surplus electric power at the transmitter. In the case of a traditional transmission system of inserting repetitive signals into guard intervals, transmission power is raised by the guard interval. In the communication system of the present invention, therefore, the same SN ratio at the reception side can be accomplished with the same transmission power by transmitting no repetitive signal to save the electric power and using the saved power to increase the signal power of symbols to be transmitted (as described earlier). Thus, differences in decoding performance can be eliminated by devising such a scheme at the transmitter.

The above problem may be solved by improving the SN ratio of the received signal in accordance with the situation of the propagation path which causes delayed waves. If the delayed-wave component overflowing from the end of the effective symbol is extracted from the guard interval and only the delayed-wave component is added to the head of the effective symbol instead of adding the entire guard interval to the head of the effective symbol, the noise component to be added to the head of the effective symbol can be minimized and the SN ratio of the received signal can be improved. The delayed-wave component of a propagation path can be determined from the maximum delay time found by the estimation of the propagation path.

The length of the waveform-shaping portion can be prescribed in accordance with the reception power detected from the preamble signal or the like. It is desirable to elongate the waveform-shaping portion if the reception power of the preamble signal is large and shorten the waveform-shaping portion if the reception power of the preamble signal is small, because if the reception power of the preamble signal is small, the ratio of the noise component in the delayed-wave portion is large and, hence, waveform-shaping effect cannot be expected much. On the contrary, signal quality may deteriorate.

Figure 9:
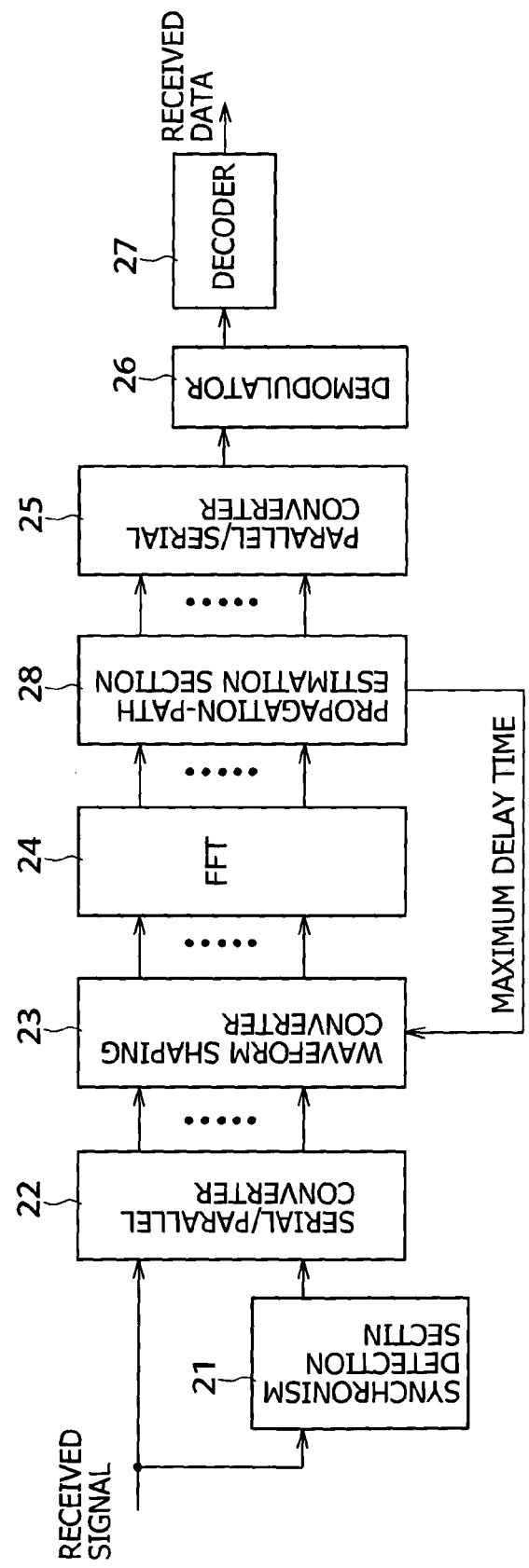
FIG. 9 is a block diagram of an OFDM receiver to improve the SN ratio of received signals in accordance with the situation of the propagation path.

FIG. 9 is a block diagram of an OFDM receiver to improve the SN ratio of received signals in accordance with the situation of the propagation path. The receiver of FIG. 9 differs from the receiver of FIG. 4 in that the former has a propagation-path estimating section 28 between the FFT 24 and the parallel/serial converter 25.

A pilot signal consisting of a known pattern is inserted every subcarrier or every several subcarriers. The propagation-path estimating section 28 estimates the propagation path based on OFDM signals on the frequency axis after Fourier transformation and finds the maximum delay time.

The maximum delay time is sent back to the waveform shaping section 23, which determines the delayed-wave component overflowing from the end of the effective symbol into the guard interval in accordance with the maximum delay time and adds the delayed-wave component to the head of the effective symbol.

Figure 10:
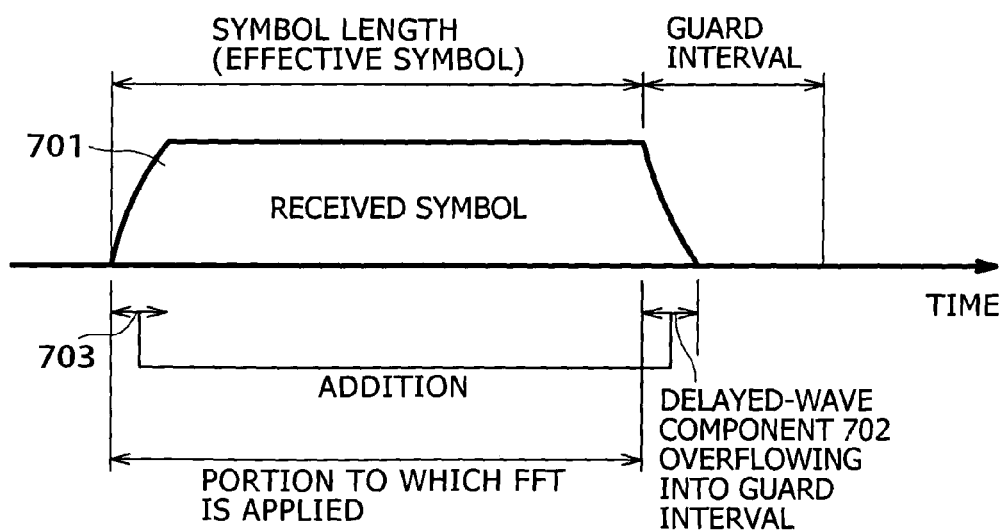
FIG. 10 is an illustration of the workings of the waveform shaping section 23 of FIG. 9.

FIG. 10 is an illustration of the working of the waveform shaping section 23. As described above, the guard interval is added to the symbol in order to add the delayed-wave component to the symbol; accordingly, necessary for the addition is only the part where the delayed waves exist. The waveform shaping section 23 adds only the part 702 overflowing from the end of the effective symbol 701 of the received signal into the guard interval to the head 703 of the effective symbol 701.

Thus, the delayed-wave component 703 at the head of the received symbol and the delayed-wave component 702 in the guard interval become continuous in waveform; accordingly, interference between subcarriers does not occur, the noise component to be added to the received symbol is minimized, and the SN ratio of the received signal is improved.

As described above, by inserting a null signal instead of a repetitive signal into guard intervals, interference between symbols and between carriers can be prevented and, depending on the situation of the propagation path, the SN ratio of the received signal can be improved. Another advantage of the communication system of the present invention will be described below.

Figure 11:
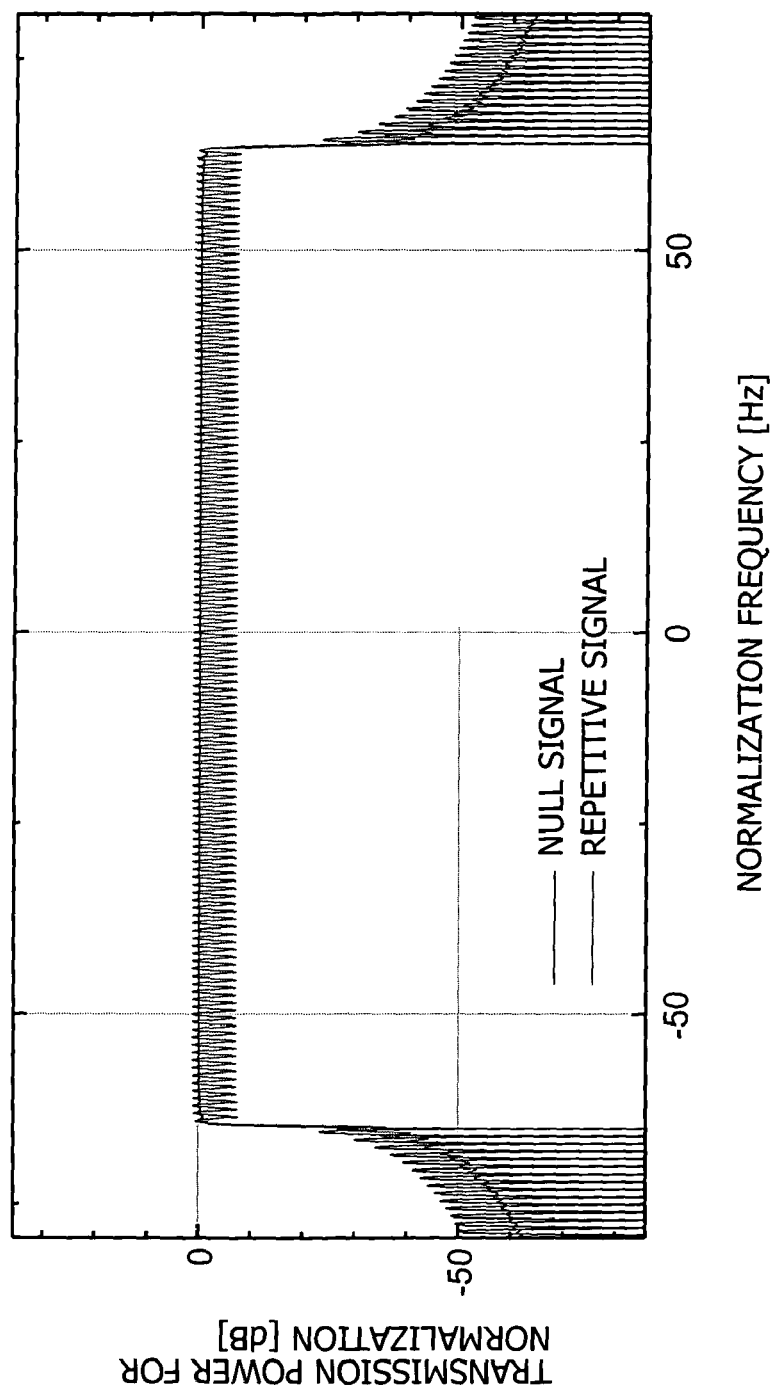
FIG. 11 shows the transmission power on the frequency axis when the guard interval is 20%.

FIG. 11 shows the transmission power on the frequency axis when the guard interval is 20%. In the case of a traditional system, the insertion of a repetitive signal elongates the length of symbols; accordingly, interference between the carriers occurs and the transmission power per unit frequency increases.

In the case of the communication system of the present invention, interference between the carriers does not occur; accordingly, the transmission power can be prevented from increasing.

Figure 12:
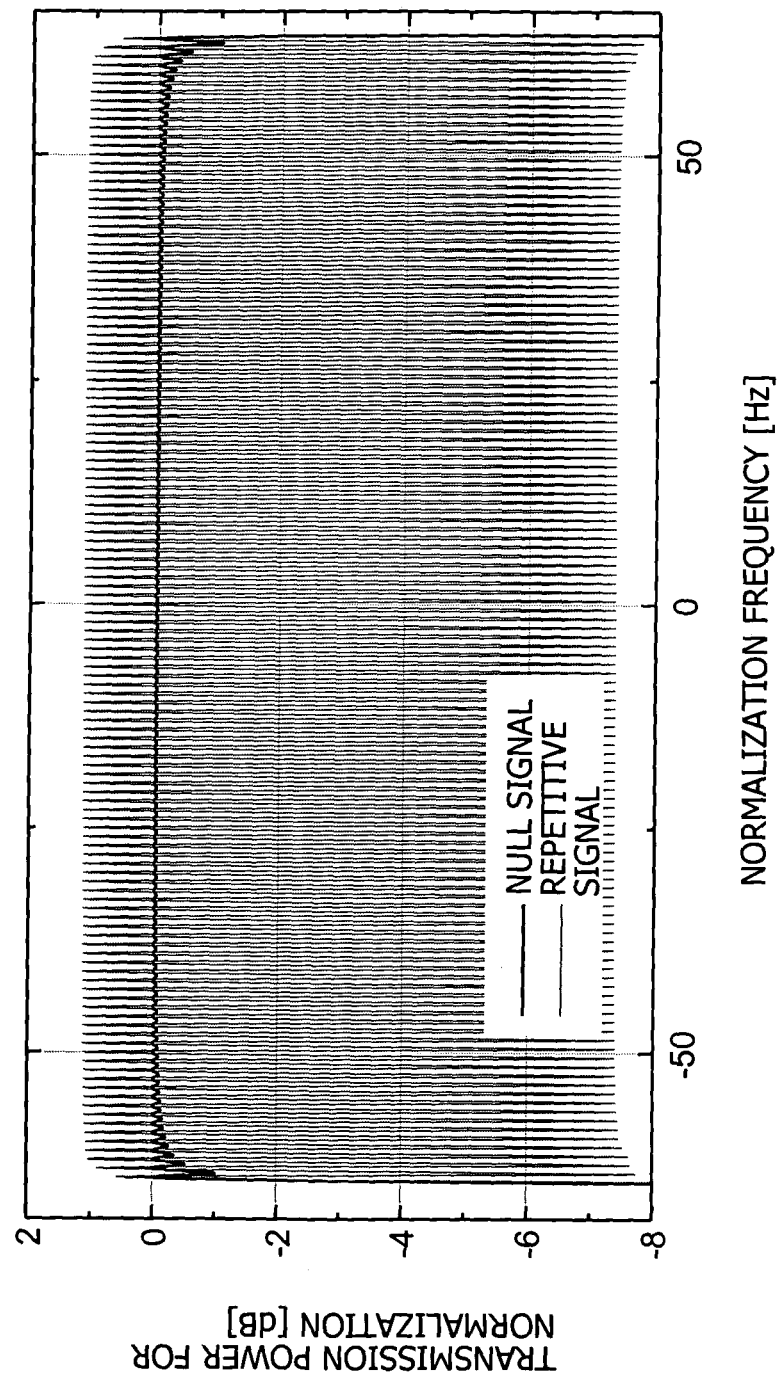
FIG. 12 is an enlarged view of the transmission power of FIG. 11.

FIG. 12 is an enlarged view of the transmission power of FIG. 11. As shown in FIG. 12, the peak transmission power of the communication system of the present invention is lower than that of a traditional system by about 1.1 dB. Thus, when the transmission power per unit frequency is restricted, the communication system of the present invention can transmit signals without wasting transmission power.

The correlated output of a preamble signal (or a signal of a known pattern coming from a transmitter) may be used to find the maximum delay time $T_d$ at the receiver.

Figure 13:
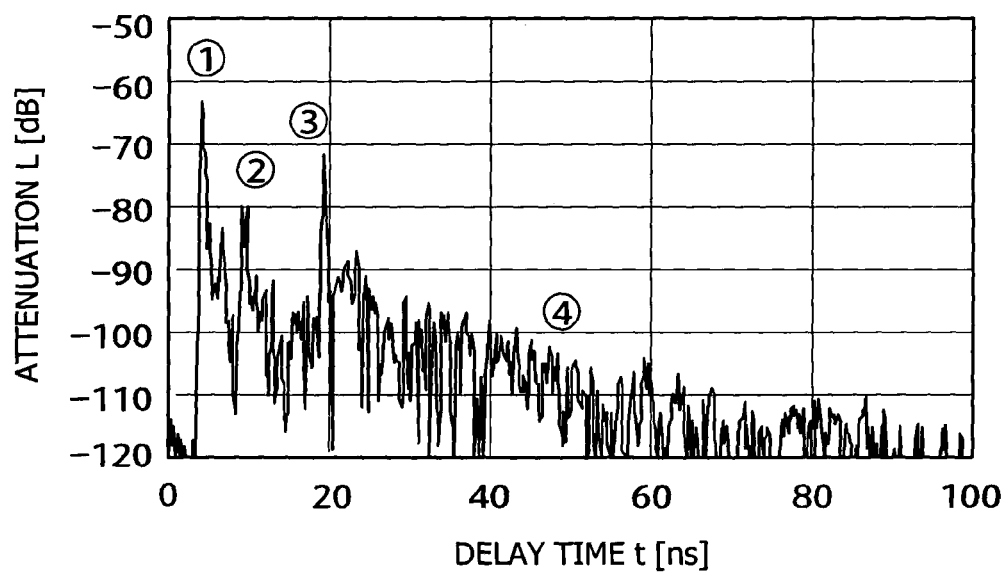
FIG. 13 is an illustration of the spectrum of a delayed wave in a multi-path environment.

FIG. 13 is an illustration of the spectrum of a delayed wave in a multi-path environment such as a room. As shown in FIG. 13, strong delayed waves (2) and (3) follow a first incoming wave (1) and, though weak, a number of delayed waves (4) are to follow. Such a delayed-wave spectrum is regarded as a transfer function and is convoluted in time to form a received signal.

Figure 14:
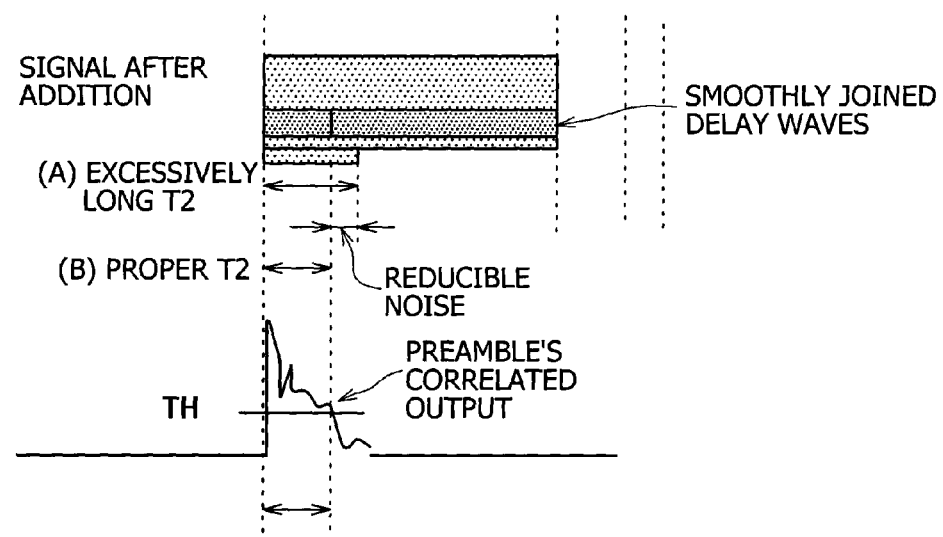
FIG. 14 shows a mechanism for finding a delay time T2 nearly equivalent to the maximum delay time by comparing correlated output of a preamble's received signal with a prescribed threshold TH.

As shown in FIG. 14, a delay time $T_2$ nearly equivalent to the maximum delay time is found by comparing correlated output of a preamble's received signal with a prescribed threshold TH. Then, a signal component corresponding to a proper delay time $T_2$ following an effective symbol is sliced and added to the head of the effective symbol. As a result, the delayed-wave components become continuous in waveform. Further, the unnecessary noise component to be added can be minimized.

Figure 15:
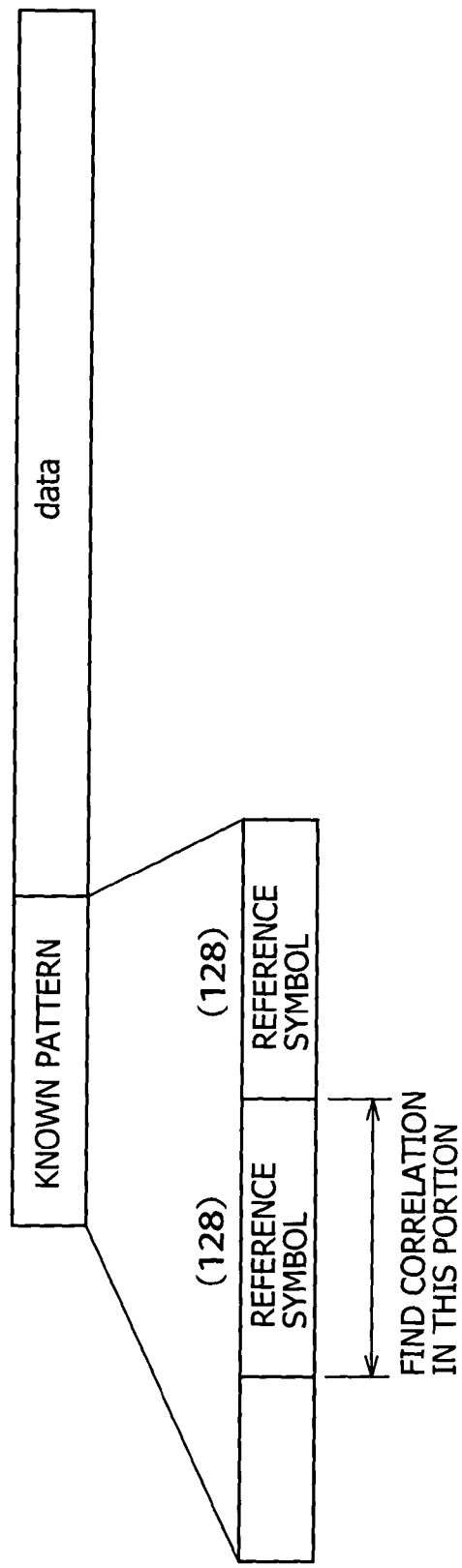
FIG. 15 shows a mechanism for performing correlating processing by using one reference symbol.
Figure 16:
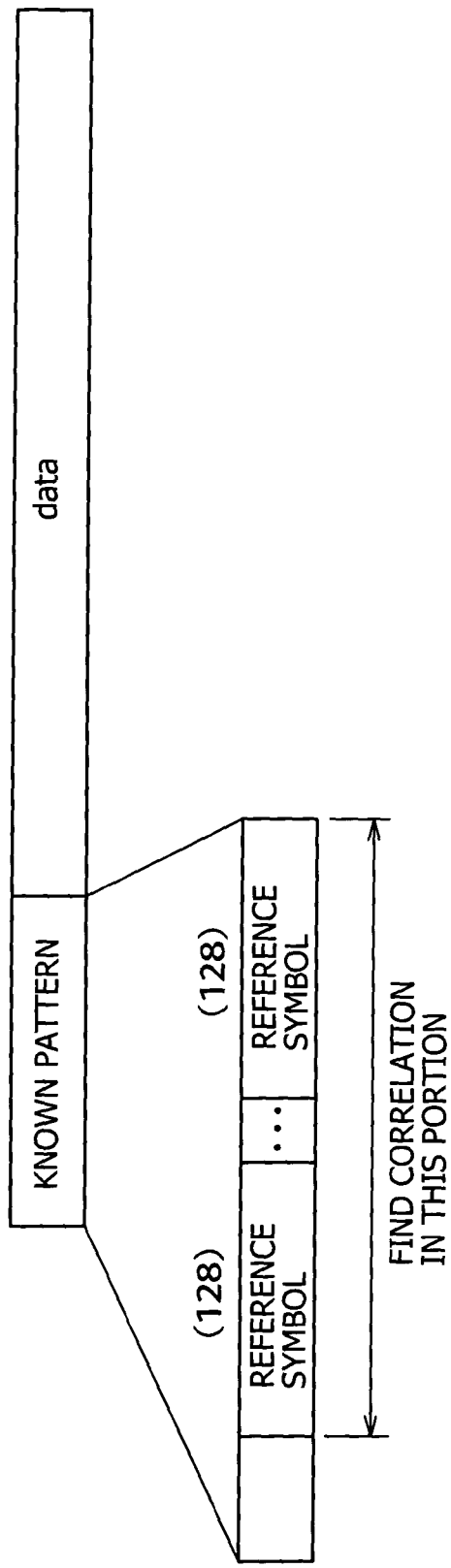
FIG. 16 shows a mechanism for performing correlating processing by using two or more reference symbols.

As shown in FIG. 15, to the head of a conventional transmission data frame, a preamble of a known pattern is added, generally, for obtaining information about synchronization and for other purposes. This preamble is formed by joining two or more reference symbols each of them consisting of 128 samples, for example. By making processing of correlation by using one reference symbol, for example, a proper delay time $T_2$ can be estimated. Since measurement can be made by one-to-a bandwidth, if the bandwidth is 1.5 GHz and the number of samples is 128, the resolution is 0.67 nanoseconds and the effective symbol length is 85.3 nanoseconds. Alternatively, as shown in FIG. 16, by making the processing by using two or more reference symbols, the portion of correlation can be made longer and the sensitivity of the means for correlation can be improved.

FIG. 17 is a block diagram of an OFDM receiver, wherein a proper delay time $T_2$ is calculated, the delay time $T_2$ being for slicing a signal component following an effective symbol by correlated output of a preamble signal, and added to the head of the effective symbol, thereby improving the reception SN ratio. The OFDM receiver of FIG. 17 differs from the OFDM receiver of FIG. 9 in that a delay time estimation section 29 is added after the FFT 24.

A pilot signal consisting of a known pattern is inserted every subcarrier or several subcarriers sent from a transmitter. The delay time estimation section 29 can estimate the propagation path based on OFDM signals on the frequency axis after the Fourier transformation and find a proper delay time $T_2$.

The delay time $T_2$ obtained here is sent back to the waveform shaping section 23. The waveform shaping section 23 slices a delayed-wave component, of a guard interval, equivalent to the delay time $T_2$ overflowing from the end of each effective symbol and adds it to the head of the effective symbol.

Figure 18:
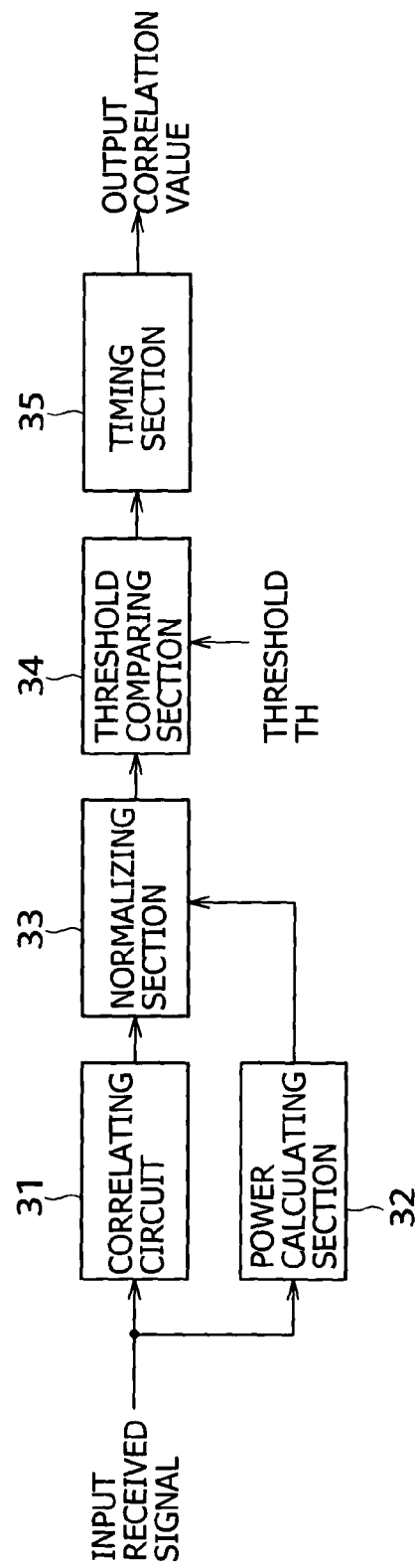
FIG. 18 is a block diagram of a delay time estimation section 29.

FIG. 18 is a block diagram of the delay time estimation section 29. The delay time estimation section 29 of FIG. 18 comprises a correlating circuit 31, a power calculating section 32, a normalizing section 33, a threshold comparing section 34, and a timing section 35.

The correlating circuit 31 finds correlation by using a known pattern included in a received signal. A method of calculating the correlation will be described later. The power calculating section 32 calculates the electric power of the received signal. The normalizing section 33 normalizes the result of correlation based on the calculated power. The threshold comparing section 34 compares the normalized result of correlation with a prescribed threshold. Then the timing section 35 times, based on the comparison with the threshold, the maximum delay time of a delayed wave included in a received wave. A method of comparing the correlated output of the received wave with the threshold will be described later.

FIG. 19 is another block diagram of the delay time estimation section 29. The delay time estimation section 29 of FIG. 19 comprises a correlating circuit 31, a threshold multiplying section 36, a comparing section 37, and a timing section 35.

The correlating circuit 31 finds correlation by using a known pattern included in a received signal. The power calculating section 32 calculates the electric power of the received signal. The threshold multiplying section 36 multiplies the calculated power by a prescribed threshold. The comparing section 37 compares the result of correlation with the product. Then, the timing section 35 times the maximum delay time based on the comparison. In this case, the division for normalization can be replaced with the multiplication of the threshold. The circuit of a multiplier is simpler than that of a divider; therefore, the cost of the communication system can be reduced by using a multiplier instead of a divider.

FIG. 20 is a block diagram showing an inner configuration of the correlating circuit 31. In the example of FIG. 20, a reference symbol portion is composed of k samples $h_0$-$h_{k-1}$ of known patterns. The correlating circuit 31 of FIG. 20 comprises a shift register 41 holding k samples on the time series inputted one by one, a reference symbol holding section 42 holding reference symbols, k multipliers 43 multiplying each one of the samples corresponding to a received symbol on the time series by another, an adder 44 using output of such multiplication and finding the sum of squares of an I-axis signal and a Q-axis signal, and an absolute-value circuit 45 outputting the result as a correlation value. The sum of squares obtained by the absolute-value circuit 45 is outputted as a value of correlation between a reference symbol held beforehand and a received reference symbol.

FIG. 21 is a block diagram showing another inner configuration of the correlating circuit 31. In the example of FIG. 21, a reference symbol portion is composed of k samples $h_o$-$h_{k-1}$ of known patterns, and the same reference symbols are repeatedly sent a prescribed number of times from a transmitter. The correlating circuit 31 of FIG. 21 comprises shift registers 41A and 41B holding received symbols on the time series inputted one by one, k multipliers 43 multiplying each one of the samples corresponding to a received symbol on the time series by another, an adder 44 using output of such multiplication and finding the sum of squares of an I-axis signal and a Q-axis signal, and an absolute-value circuit 45 outputting the result as a correlation value. Therefore, it is possible to find auto-correlation in which known patterns appearing repeatedly in the received signal are correlated with one another.

Figure 22:
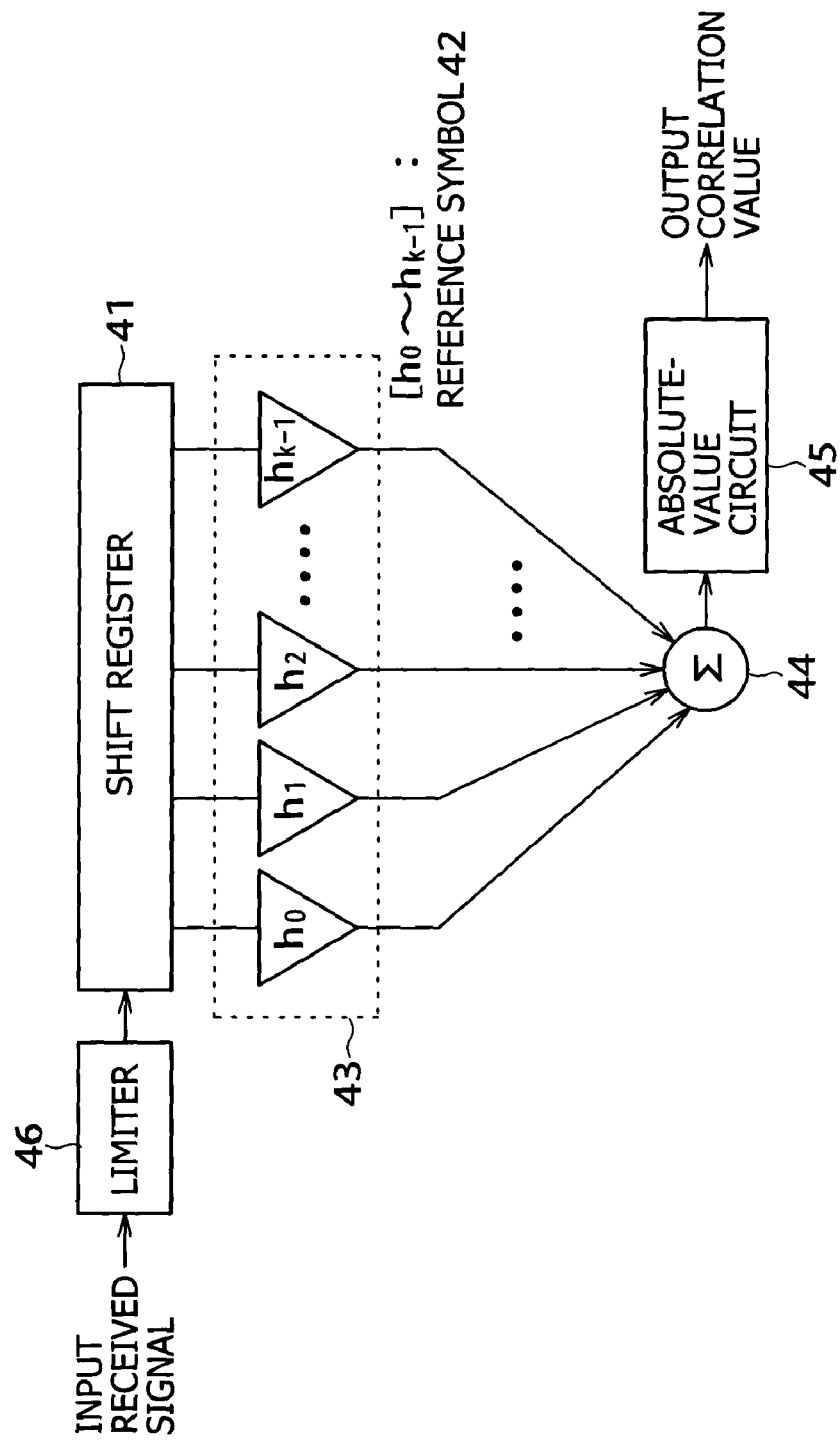
FIG. 22 is still another block diagram of the inner configuration of the correlating circuit 31.

FIG. 22 is a block diagram showing still another inner configuration of the correlating circuit 31. In the example of FIG. 22, a reference symbol portion is composed of k samples $h_o$-$h_{k-1}$ of known patterns. The correlating circuit 31 of FIG. 22 comprises a limiter 46 normalizing received signals, a shift register 41 holding the normalized k received symbols on the time series, a reference-symbol holding section 42 holding k reference symbols, k multipliers 43 multiplying each one of the samples corresponding to a received symbol on the time series by another, an adder 44 using output of such multiplication and finding the sum of squares of an I-axis signal and a Q-axis signal, and an absolute-value circuit 45 outputting the result as a correlation value. The sum of squares obtained by the absolute-value circuit 45 is outputted as a value of correlation between a reference symbol held beforehand and a received reference symbol. The correlating circuit 31 of FIG. 22 can provide correlation value output including the power calculation and normalization of FIG. 18.

Figure 23:
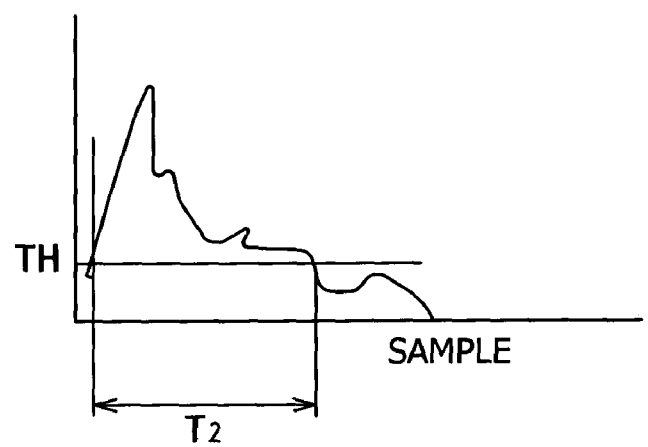
FIG. 23 shows an example of timing processing of the maximum delay time through correlation value output and threshold comparison by a threshold comparing section 34 and a timing section 35.

FIG. 23 shows an example of timing processing of the maximum delay time through correlation value output and threshold comparison by the threshold comparing section 34 and timing section 35. As shown in FIG. 23, the correlation value output is compared with a threshold TH, and a time period $T_2$ in which the correlation value exceeds the threshold TH is estimated as a delay time.

Figure 24:
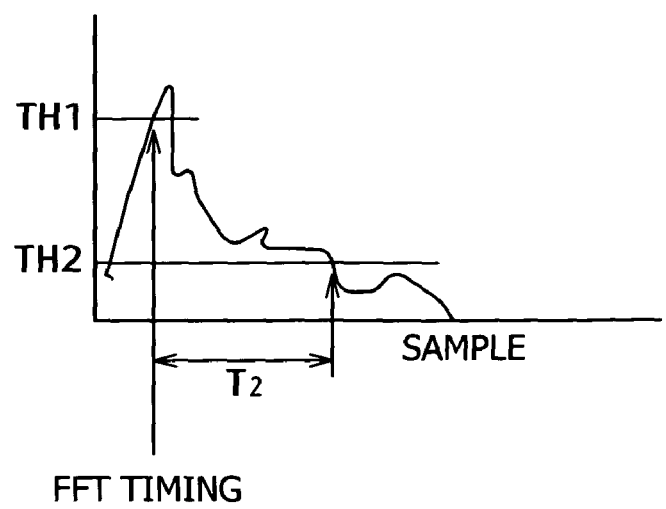
FIG. 24 shows another example of timing processing of the maximum delay time through correlation value output and threshold comparison by the threshold comparing section 34 and timing section 35.

FIG. 24 shows another example of timing processing of the maximum delay time through correlation value output and threshold comparison by the threshold comparing section 34 and timing section 35. In the example shown in FIG. 24, the correlation value output is compared with two thresholds TH1 and TH2. With regard to one threshold TH1, a peak value of the correlation value output is used as FFT timing. The other threshold TH2 is used for detecting the maximum delay time. A period from a point where the correlation value output exceeds the threshold TH1 to a point where it becomes below the threshold TH2 is estimated as a delay time $T_2$.

A delay time $T_2$ may be obtained through multiplying the estimated delay time by a prescribed correction factor. Alternatively, a delay time $T_2$ may be obtained by adding a prescribed offset time.

SUPPLEMENT

There has been described the present invention with reference to the specific embodiment. However, it is further understood by those skilled in the art that various changes and modifications may be made in the embodiment without departing from the spirit and scope of the present invention. That is to say, the present invention has been disclosed in the form of exemplification. The contents of this specification must not be interpreted limitedly. The spirit and scope of the invention should be judged in consideration of the appended claims.

What is claimed is:

1. A radio communication system for multi-carrier transmission, comprising:
   a transmitter to transmit a multi-carrier signal whose guard interval period comprises a null signal; and
   a receiver to receive the multi-carrier signal whose guard interval period between effective symbols comprises the null signal and to use a portion of the guard interval period including a delayed-wave signal component of an effective symbol following the effective symbol of the received multi-carrier signal to perform waveform shaping for a signal component at the head of the effective symbol, the receiver uses only the portion of the guard interval including the delayed-wave signal component to perform the waveform shaping, and said receiver detects synchronization timing from a preamble signal included in the received signal, detects reception power of the preamble signal, and determines a length of a portion of the received multi-carrier signal where said waveform shaping is performed, corresponding to a length of the portion of the guard interval including the delayed-wave component, in accordance with the detected reception power.

2. The radio communication system according to claim 1, wherein a guard/interval inserting section produces the null signal by a connection to ground.

* * * * *